United States Patent Office 3,019,232
Patented Jan. 30, 1962

3,019,232
PROCESS FOR PRODUCING SYNTHETIC TRYPTOPHANE
Setsuji Sakurai, Fujisawa City, Yoshioki Komachiya, Tokyo, and Tamio Ito, Kawasaki City, Japan, assignors to Ajinomoto Co., Inc., Tokyo, Japan
No Drawing. Filed Nov. 24, 1959, Ser. No. 855,015
Claims priority, application Japan Dec. 18, 1958
7 Claims. (Cl. 260—319)

The present invention relates to a process for producing tryptophan, and more particularly to a process of synthesizing tryptophan, from easily available compounds.

Tryptophan is one of the essential amino acids and has important applications in the fields of medicine and biochemistry.

It is practically impossible to obtain tryptophan by acid hydrolysis of protein, since tryptophan reacts with the glucose produced by decomposition of carbohydrates contained in the raw material, to form dark coloured insoluble humin. The use of alkalies instead of acids for hydrolysis of protein is not convenient in an industrial operation. Enzymatic hydrolysis not only requires a very long time, but it also does not proceed to completion and gives a low yield.

It is the main object of this invention to produce tryptophan from a comparatively cheap and easily obtainable compound and in a high yield.

We have found that the phenylhydrazone of α-ketoglutaric acid (I), which has recently become available at low cost, when subjected to indol condensation in alcohol, forms ethyl [2-carboethoxy-indolyl-(3)]-acetate (II). When the latter is further subjected to condensation with a diethyl oxalate, ethyl β-[2-carboxy-indolyl-(3)]-ethoxalyl-acetate (III) is obtained in a good yield. When the thus obtained compound (III) is heated in acetic acid in the presence of a catalyst, p-toluenesulfonic acid, there is formed 2′,3′-indo-3,4-pyrone-(2)-carboxylic acid-(6) (IV) but not β-[2-carboxy-indolyl-(3)]-pyruvic acid (V).

We have further found that said β-[2-carboxy-indolyl-(3)]-pyruvic acid (V) can be obtained in a high yield, if said 2′,3′-indo-3,4-pyrone-(2)-carboxylic acid-(6) (IV) is treated with an aqueous solution of a caustic alkali.

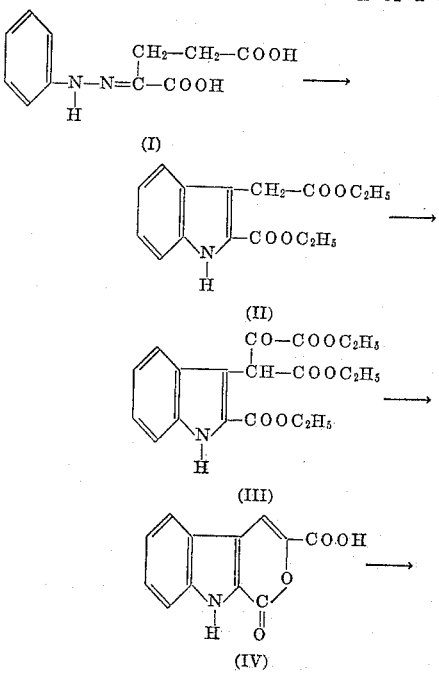

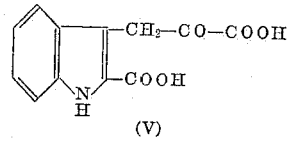

In order to carry out the last mentioned reaction, 2′,3′-indo-3,4-pyrone-(2)-carboxylic acid-(6) is suspended in an aqueous solution of about 20% caustic alkali and the suspension is agitated. The reaction is completed in 60–90 minutes at room temperature and in 5–6 minutes at 80° C. The compound formed thereby may be separated from the reaction mixture by cooling and acidifying the latter, extracting the compound with a solvent such as ethyl ether, ethyl acetate and the like from said reaction mixture and evaporating the solvent from the extract. Almost pure β-[2-carboxy-indolyl-(3)]-pyruvic acid is obtained.

EXAMPLE 1

19.5 g. of 2′,3′-indo-3,4-pyrone-(2)-carboxylic acid-(6) are added to an aqueous solution of 29 g. of caustic potash in 100 cc. of water and the mixture is agitated at 25° C. The compound dissolves completely. After agitation has been continued for 1 hour, 20% sulfuric acid is added drop by drop to the solution to adjust its pH to 1.5 while it is being cooled with ice. The acidified solution is extracted with ethyl ether 5 times. Ether is evaporated from the combined extracts at reduced pressure. The residue weighs 15 g. After recrystallization from acetone-benzene, 11 g. of crystallized β-[2-carboxy-indolyl-(3)]-pyruvic acid are obtained.

The melting point of the compound (V) cannot be determined, because the compound is easily converted to 2′,3′-indo-3,4-pyrone-(2)-carboxylic acid (6) at elevated temperature. The results of an analysis compare with values calculated for $C_{12}H_{19}O_5N$ as follows:

Calculated: C, 58.30; H, 3.67; N, 5.67. Found: C, 58.45; H, 3.61; N, 5.65.

Quantitative determination of β-[2-carboxy-indolyl-(3)]-pyruvic acid by means of 2,4-dinitrophenyl-hydrazone shows a yield of 82%. For this purpose 12 cc. of the reaction mixture acidified to pH 1.5 with sulfuric acid are withdrawn as a sample and 200 cc. of a 0.2% aqueous solution of 2,4-dinitrophenyl-hydrazine hydrochloride are added 1.2 g. of hydrazone crystals are formed. When recrystallized from water-ethanol, 0.6 g. of crystals having a melting point of 227–228° C. are obtained. The results of an analysis compare with values calculated for $C_{18}H_{13}O_8N_5$ as follows:

Calculated: C, 50.59; H, 3.07; N, 16.39. Found: C, 50.17; H, 3.54; N, 15.83.

We have further found that β-[2-carboxy-indolyl-(3)]-pyruvic acid (V) when reacted with ammonia and then hydrogenated is transformed into β-[2-carboxy-indolyl-(3)]-α-aminopropionic acid (VI).

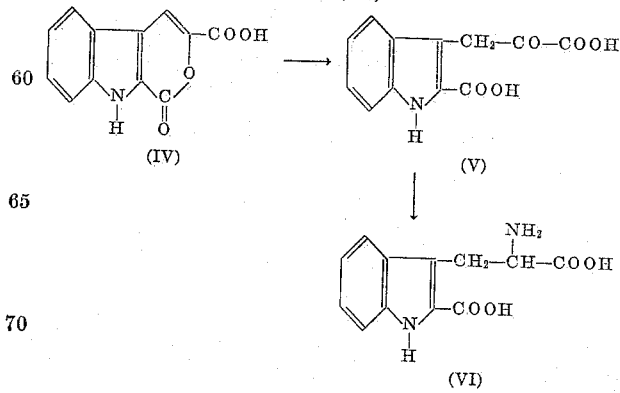

In order to convert β-[2-carboxy-indolyl-(3)]-pyruvic acid (V) to β-[2-carboxy-indolyl-(3)]-α-aminopropionic acid (VI), a concentrated aqueous solution of ammonia is added to the reaction mixture containing (V) and hydrogen is then introduced in the presence of Ni catalyst at 50° C. under 50 atm. for 90 min. The yield is about 95%.

The absorption of hydrogen does not occur at a temperature lower than 35° C. and the relation between the yield and conditions for the reaction may be understood from the following table:

Table 1

| Initial pressure, atm. | Temperature, °C. | Yield, percent |
|---|---|---|
| 15 | 35 | 22.6 |
| 15 | 50 | 63.6 |
| 40 | 38 | 80 |
| 50 | 50 | 95 |

EXAMPLE 2

19.5 g. of 2′,3′-indo-3,4-pyrone-(2)-carboxylic acid (6) (IV) are added to a solution of 29 g. of caustic potash in 100 cc. of water and the resulting mixture is agitated for 1 hour at 25° C. To the reaction mixture containing β-[2-carboxy-indolyl-(3)]-pyruvic acid (V) are added 200 cc. of water and 100 cc. of 28% ammonia water, and 5 g. of Raney nickel, as catalyst, and it is subjected to hydrogenation under an initial pressure of 50 atm. at 50° C. The reaction is completed in 90 min. Nickel is filtered off and the ammonia is expelled from the reaction mixture. The solution is concentrated to about 100 cc., and its pH is adjusted to 2.5 with 20% sulfuric acid. The precipitated crystals are washed with hot water to remove potassium sulfate and further washed with 100 cc. of ethanol, giving 21 g. of crystals of β[2-carboxy-indolyl-(3)]-α-aminopropionic acid (VI). Its decomposition point is 220–222° C. and the yield is 95%. After recrystallization from water, the decomposition point is 226–228° C. one mole of water of crystallization is present. The analysis result compares with the calculated values for $C_{12}H_{12}O_4N_2 \cdot H_2O$ as follows:

Calculated: C, 54.20; H, 5.27; N, 10.53. Found: C, 54.04, H, 5.28, N, 10.90.

The benzoyl derivative which is obtained from compound (VI) in 70% yield has its decomposition point at 236–237° C. and its analysis compares with the calculated values for $C_{19}H_{16}O_5N_2$ as follows:

Calculated: C, 64.77; H, 4.58; N, 7.95. Found: C, 64.70; H, 4.45; N, 7.99.

The compound (VI) may be converted to β-[2-carboxy-indolyl-(3)]-α-uramino-propionic acid (VII) with high yield. 32 g of β-[2-carboxy-indolyl-(3)]-α-amino-propionic acid monohydrate and 43.2 g. of urea are heated in 360 cc. of water in the presence of 86 g. of barium hydroxide to the boiling temperature for 5 hours. The reaction mixture is filtered while hot. The filtrate, after being cooled, is adjusted to pH 2 with hydrochloric acid. Crystals which precipitate from the solution while standing over night, are washed with water and dried. 34.2 g. of crude β-[2-carboxy-indolyl-(3)]-α-uramino-propionic acid (VII) are thus obtained. Instead of barium hydroxide, sodium hydroxide may be used as a condensing agent. However, the former gives a compound of higher purity than the latter. The following table illustrates the relationship between reaction conditions and yields. The figures in brackets show molar proportions.

Table 2

| Compound (VI), g. | NaOH, g. | Ba(OH)₂, g. | Urea, g. | H₂O, cc. | Boiling time, hrs. | Yield, percent |
|---|---|---|---|---|---|---|
| 32.0 (1.0) | 4.8 (1.0) | 0 | 36.0 (5.0) | 360 | 5 | 65.9 |
| 32.0 (1.0) | 11.1 (2.3) | 0 | 36.0 (5.0) | 360 | 5 | 85.8 |
| 32.0 (1.0) | 16.8 (3.5) | 0 | 36.0 (5.0) | 360 | 5 | 64.5 |
| 32.0 (1.0) | 4.8 (1.0) | 34.0 (0.9) | 36.0 (5.0) | 300 | 5 | 87.9 |
| 32.0 (1.0) | 4.8 (1.0) | 34.0 (0.9) | 36.0 (5.0) | 600 | 5 | 84.4 |
| 32.0 (1.0) | 9.6 (2.0) | 34.0 (0.9) | 36.0 (5.0) | 600 | 5 | 86.6 |
| 32.0 (1.0) | 0 | 72.0 (1.9) | 36.0 (5.0) | 360 | 4 | 84.2 |
| 32.0 (1.0) | 0 | 86.0 (2.28) | 43.2 (6.0) | 360 | 5 | 91.9 |
| 32.0 (1.0) | 0 | 72.0 (1.9) | 25.2 (3.5) | 1,260 | 5 | 48.6 |
| 32.0 (1.0) | 0 | 72.0 (1.9) | 36.0 (5.0) | 1,800 | 5 | 51.3 |
| 32.0 (1.0) | 0 | 72.0 (1.9) | 50.3 (7.0) | 2,515 | 5 | 78.5 |

We have further found that decarboxylation of compound (VII) takes place when the same is heated in hydrochloric acid containing an alcohol, and 3-(hydanto-5′-yl-methyl)-indol (IX) is obtained in a good yield. The compound (IX) is converted almost quantitatively to tryptophan (X), when the former is hydrolyzed in an aqueous solution of ammonia or caustic soda.

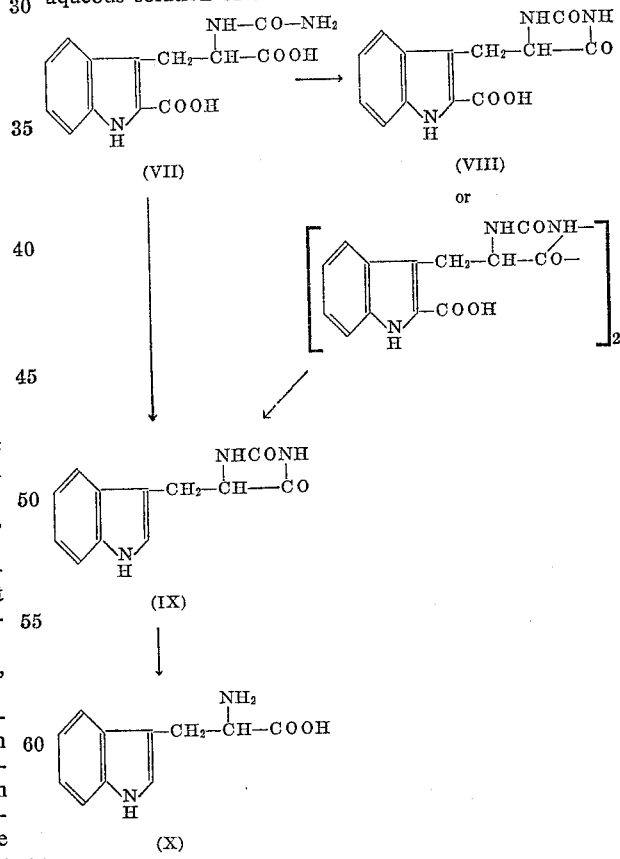

EXAMPLE 3

3.08 g. of β-[2-carboxy-indolyl-(3)]-α-uramino-propionic acid monohydrate are added to a solution consisting of 15 cc. of ethanol and 30 cc. of concentrated hydrochloric acid and the mixture is held at 86–90° C. for 30 minutes. After cooling, crystals are precipitated which weigh 0.16 g. and have a decomposition point of 282–284° C. (the hereinafter discussed Compound VIII). A portion of the filtrate obtained after removal of the crystals is evaporated at reduced pressure to dryness. The residue is recrystallized from 10 cc. of 50% aqueous ethanol and 0.97 g. of 3-(hydanto-5'-yl-methyl)-indol (IX) having a melting point of 217.5° C. are obtained. The remainder of the aforementioned filtrate, from which 0.16 g. of crystals (VIII) have been separated, is mixed with 100 cc. of 28% ammonia water and kept at 170° C. for 2 hours. The ammonia water is then evaporated at reduced pressure. 1.93 g. of crude tryptophan having a decomposition point of 262–263° C. are obtained. Its purity is determined as 90% by bioassay. Accordingly, the yield of the Compound IX produced by decarboxylation from the Compound VII is more than 1.94 g. which corresponds to more than 85% yield.

Although the decarboxylation may be performed in hydrochloric acid only, the yield of Compound IX is then approximately half of that of Compound VIII. On the contrary, when decarboxylation is carried out in hydrochloric acid containing an alcohol, the yield of Compound IX increases substantially. When a mixture of 1 volume of ethanol and 2 volumes of hydrochloric acid is used, the yield reaches 85%. However, the use of too much alcohol results in the predominant formation of Compound VIII. Methanol, ethanol, isopropanol or like alcohols may be used. Instead of hydrochloric acid, sulfuric acid may be used. Phosphoric acid is less effective and such weak acids as acetic acid are ineffective. The decarboxylation depends on the kind of solvents used, but essentially proceeds at a temperature above 80° C. Too high a temperature, however, causes the decomposition of Compound IX. The respective yields of Compounds IX and VIII with various combinations of acids and alcohols at different temperatures are seen in Table 3. In all reactions, 3.08 g. of $\beta$-[2-carboxy-indolyl-(3)]-$\alpha$-uramino-propionic acid monohydrate (VII) were used as a starting material. The yields of Compound IX are calculated from that of tryptophan (X), assuming the latter to be obtained from Compound IX without loss.

The Compound VIII is decarboxylated by heating in paraffin to 290° C. The residue after removal of the paraffin is hydrolyzed with an aqueous solution of caustic soda, and tryptophan (X) is obtained in a yield of approximately 50%. However, if 1 mole of Compound VIII is boiled in an aqueous solution of 2 moles of caustic soda for 6 hours, it is transformed into the Compound VII and if it is treated with an aqueous solution of 6 moles of caustic soda, the Compound VI is formed almost quantitatively.

The Compound IX can be easily converted to tryptophan (X) in the usual manner. For example, 22.7 g. of 3-(hydanto-5'-yl-methyl)-indol (IX) are added to a solution of 14.5 g. of causic soda in 280 cc. of water and the mixture is heated to 150° C. ±3° C. for 30 minutes. After cooling, the reaction mixture is evaporated to about 100 cc., decolorized with activated carbon, mixed with 50 cc. of ethanol, adjusted to a pH below 6.0 with acetic acid and left standing overnight in a cold room. The precipitated crystals are separated from the mother liquor, washed with water and ethanol, and dried. The crystals obtained weigh 16.3 g. and are so pure that recrystallization is almost unnecessary. They have a decomposition point of 283–4° C. Since 2.5 g. of tryptophan can be recovered from the mother liquor by resin treatment, the yield of the hydrolyzing procedure amounts to 92%.

What we claim is:
1. In a process of producing tryptophan, the steps of treating 2',3'- indo - 3,4-pyrone-(2)-carboxylic acid-(6) with an aqueous solution of caustic alkali, whereby $\beta$-[2-carboxy-indolyl-(3)]-pyruvic acid is formed; reacting said $\beta$-[2-carboxy-indolyl-(3)]-pyruvic acid with ammonia; and hydrogenating the reaction product obtained in the presence of a nickel hydrogenation catalyst to form $\beta$-[2-carboxy-indolyl-(3)-]-$\alpha$-amino-propionic acid.

2. In a process of producing tryptophan, the steps of

Table 3

| Alcohol (or water) | Cc. | Acid | Cc. | Temperature (° C.) | Yield of (IX) | | Yield of (VIII) | |
|---|---|---|---|---|---|---|---|---|
| | | | | | (G.) | (Percent) | (G.) | (Percent) |
| Water | 15 | Conc. HCl | 30 | 105–106 | 0.69 | 30 | 1.60 | 59 |
| Do | 15 | do | 30 | 86– 90 | 0.92 | 40 | 1.23 | 45 |
| Ethanol | 10 | do | 35 | 86– 90 | 1.40 | 61 | 0.79 | 29 |
| Do | 15 | do | 30 | 84– 85 | 1.83 | 80 | 0.52 | 19 |
| Do | 15 | do | 30 | 86– 90 | 1.94 | 85 | 0.16 | 6 |
| Do | 7.5 | do | 15 | 86– 90 | 0.53 | 23 | 1.39 | 51 |
| Do | 4 | do | 8 | 90– 95 | 0.34 | 15 | 1.60 | 59 |
| Do | 22.5 | do | 22.5 | 86– 90 | 0.83 | 36 | 1.36 | 50 |
| Do | 30 | do | 15 | 86– 90 | 0.80 | 35 | 1.42 | 52 |
| Methanol | 15 | do | 30 | 86– 90 | 1.85 | 81 | 0.34 | 14 |
| Do | 22.5 | do | 22.5 | 82– 85 | 0.85 | 37 | 1.34 | 49 |
| Isopropanol | 15 | do | 30 | 86– 90 | 0.62 | 27 | 1.31 | 48 |
| Do | 22.5 | do | 22.5 | 86– 90 | 0.50 | 22 | 1.45 | 53 |
| Ethanol | 15 | 33% H₂SO₄ | 30 | 86– 90 | 1.83 | 80 | 0.27 | 10 |
| Do | 15 | 33% H₃PO₄ | 30 | 86– 90 | 0.46 | 20 | 0.13 | 5 |

The compound VII is heated in solution with an acid such as hydrochloric acid or sulfuric acid with or without an alcohol, Compound VIII is obtained as a by-product together with Compound IX, the former being insoluble while the latter is soluble in the reaction mixture. The fact that the dissolved compound is correctly represented by Formula IX is proved by elementary analysis and infrared spectrum which agree with those of Compound IX. Furthermore, the fact that the precipitated crystals are the compound of Formula VIII is proved by elementary analysis, decomposition point, and acid value which respectively agree with those of Compound VIII.

Decomposition point: 282–4° C.

Elementary analysis ($C_{13}H_{11}O_4N_3$): Calculated: C, 57.14; H, 4.06; N, 15.38. Found: C, 57.48; H, 4.00; N, 15.37.

Acid value: Calculated: 205. Found 204.

heating [2-carboxy-indolyl-(3)]-$\alpha$-amino-propionic acid and urea in the presence of a condensing agent selected from the group consisting of alkali metal and alkaline earth metal hydroxides to form $\beta$-[2-carboxy-indolyl-(3)]-$\alpha$-uramino-propionic acid; heating the latter acid to an elevated temperature between about 80° C. and 106° C. in aqueous solution in the presence of a strong mineral acid, whereby 3-(hydanto-5'-yl-methyl)-indol is formed.

3. A process as set forth in claim 2, wherein a lower alkanol is added to the aqueous solution in which said $\beta$-[2-carboxy-indolyl -(3)]-$\alpha$ - uramino - propionic acid is heated in the presence of the lower alkanol.

4. A process of producing tryptophan which comprises treating 2',3'-indo-3,4-pyrone-(2)-carboxylic acid-(6) with an aqueous solution of caustic alkali to form $\beta$-[2-carboxy-indolyl-(3)]-pyruvic acid; reacting said $\beta$-

[2-carboxy-indolyl-(3)]-pyruvic acid with ammonia; subjecting the reaction product obtained to hydrogenation in the presence of a nickel hydrogenation catalyst at a temperature of at least 35° C. and hydrogen pressure of between about 15 atmospheres and 60 atmospheres, whereby β-[2-carboxy-indolyl-(3)]-α-amino-propionic acid is formed; heating the latter acid and urea to an elevated temperature between about 80° C. and 106° C. in the presence of a condensing agent selected from the group consisting of alkali metal and alkaline earth metal hydroxides to form β-[2-carboxy-indolyl-(3)]-α-uramino-propionic acid; heating said β-[2-carboxy-indolyl-(3)]-α-uramino-propionic acid in aqueous solution in the presence of a strong mineral acid, whereby 3-(hydanto-5'-yl-methyl)-indol is formed; and hydrolyzing the hydantoyl group of said 3-(hydanto-5'-yl-methyl)-indol to form tryptophan.

5. A process as set forth in claim 4, wherein said β-[2-carboxy-indolyl-(3)]-α-uramino-propionic acid is heated in the additional presence of a lower alkanol.

6. A process as set forth in claim 4, wherein said hydantoyl group is hydrolyzed in an alkaline medium.

7. A process as set forth in claim 4, wherein said hydrogen pressure is between substantially 30 and 50 atmospheres.

No references cited.